United States Patent [19]

Schöll et al.

[11] 4,194,060
[45] Mar. 18, 1980

[54] ELECTRIC ACCUMULATOR AND STORAGE CELL

[76] Inventors: Günter Schöll, Hauffstrasse 14; Joachim Pauls, Meisenweg 3, both of 7441 Wolfschlugen, Fed. Rep. of Germany

[21] Appl. No.: 906,855

[22] Filed: May 17, 1978

[30] Foreign Application Priority Data

May 18, 1977 [DE] Fed. Rep. of Germany ....... 2722461

[51] Int. Cl.$^2$ ..................... H01M 10/06; H01M 4/14
[52] U.S. Cl. .................................... 429/67; 429/227; 429/228; 429/234; 429/246; 429/247
[58] Field of Search ............. 429/225, 228, 245, 235, 429/234, 233, 67, 94, 205, 204, 129, 130, 72, 143, 146, 227, 247, 246

[56] References Cited

U.S. PATENT DOCUMENTS

| | | | |
|---|---|---|---|
| 711,537 | 10/1902 | Sedgwick | 429/225 |
| 711,917 | 10/1902 | Winkes | 429/225 |
| 715,343 | 12/1902 | Blanc | 429/245 |
| 3,395,044 | 7/1968 | Shoeld | 429/225 X |
| 3,421,944 | 1/1969 | Bauer | 429/130 X |
| 3,472,696 | 10/1969 | Shoeld | 429/225 X |

Primary Examiner—Anthony Skapars
Attorney, Agent, or Firm—Karl F. Ross

[57] ABSTRACT

An electric accumulator or storage cell whose positive and negative plates are composed of a multiplicity of thin lead plates or lead foils which are spaced apart from thin separators in a receptacle adapted to receive an electrolyte (dilute sulfuric acid), the receptacle having dimensions closely conforming to those of the stacked plates. The thin lead plates or foils which form both the positive and negative electrodes are formed at juxtaposed regions with exactly coextensive electrically nonconducting and electrolyte impermeable masks of a material adhering strongly to the electrodes.

34 Claims, 13 Drawing Figures

ELECTRIC ACCUMULATOR AND STORAGE CELL

FIELD OF THE INVENTION

The present invention relates to an electric accumulator or storage battery or cell whose positive and negative electrodes are each composed of a multiplicity of thin lead plates or lead foils spaced apart by thin separators and disposed in a receptacle containing the electrolyte (dilute sulfuric acid $H_2SO_4$), the dimensions of the receptacle conforming substantially to that of the stacked plates.

BACKGROUND OF THE INVENTION

In all galvanic secondary elements, i.e. accumulators or storage cells, the charging time is a function of the thickness of the active mass. The charging time is the time required for transforming the active mass from its discharged state to its charged state by the electrochemical process.

The thinner the active mass is, the more rapidly can the charging process be effected. However, as the thickness of the active mass increases, the charging process becomes slower. The reason for this is the limited velocity of the ion migration and the resulting limiting current density in amperes/ $m^2$ which can be developed. As the driving potential or applied voltage during charging increases above a predetermined level, the desired electrochemical transformation gradually gives way to an undesired formation of oxygen and hydrogen. This potential above which oxygen and hydrogen are produced is termed the oxygen or hydrogen overvoltage.

In face of the aforedescribed problem, attempts have been made to provide accumulators with especially short charging times and therefore with relatively thin active mass layers upon the electrode surfaces. These layers should be held as thin as possible and the weight of the layer supports should be minimized so that the specific power (in watt-hours/kg) of the accumulator can be as large as possible.

In practice, this can be accomplished to a considerable extent in the lead-acid system by using thin foils of lead as the electrode material and transforming the surfaces of the thin lead foils by either the well-known Plante process or by other means into the active material. A storage battery or accumulator formed from such lead foils has the desired brief charging time in which complete transformation of the active mass can be effected. In this case as well the rate at which the active mass is charged is a function of the thickness of the foil and the layer formed thereof.

However, as a practical matter, such an accumulator is not technologically satisfactory since the forming process which occurs during each charge and discharge cycle, especially for the positive foil plates results in unstable active masses. During this forming process, there is a rapid transformation of the surface of the lead foils to the lead dioxide ($PbO_2$), while the negative foil plates undergo on long stands, a transformation to the lead sulfate ($PbSO_4$).

OBJECT OF THE INVENTION

It is an object of the present invention to provide an accumulator or storage battery of the aforedescribed type which can be charged in relatively short times and can have especially thin foils constituting the plates of the accumulator which are not damaged even after many hundreds or even thousands of charge-discharge cycles.

SUMMARY OF THE INVENTION

These objects and others which will become apparent hereinafter are attained, in accordance with the present invention, in an accumulator of the aforedescribed type which is rendered less sensitive to charge-discharge cycling, i.e. has the active mass regions of the lead foils stabilized against loss of the electrode material upon discharge-charge cycling.

More particularly, the present invention relates to a storage battery or accumulator whose positive and negative plates are composed of a multiplicity of thin lead plates or foils spaced apart by thin separators and disposed in a vessel containing an electrolyte, namely, dilute sulfuric acid ($H_2SO_4$) the vessel having dimensions conforming substantially to those of the stack of plates and closed by the vessel. According to this invention, the thin-wall lead plates or lead foils, which can be used alternatively as the positive and negative electrodes, are provided on exactly opposite locations with coextensive regions covered by a material adharent to the electrode members and which is impermeable to the electrolyte and is nonconducting. In other words, strips of the positive and negative electrodes juxtaposed with one another are masked by this material, the mask on each electrode being exactly aligned with the confronting mask of the opposite electrode.

This partial masking or covering of the plate or foil surfaces appears to have the effect that the masked portions of the electrodes are protected from contact with the electrolyte and do not participate in the charge-discharge cycling and the electrochemical processes resulting therefrom. These masked portions of the plates or foils remain metallic lead and hence mechanically stable while forming a current-supply and current-withdrawing grid or lattice which is not damaged by the electrochemical process.

It has been found to be advantageous, moreover, when the masked region of the foils or plates which serve for current supply and as mechanical supports for the active mass are uninterrupted and constitute a grid or lattice like configuration.

In the formation of the individual plates it is advantageous to apply the masking materials to the surfaces of the plates or foils in a substantially uninterrupted pattern on each foil by a printing process. In this case, the selection of the printing process can be made depending upon the material which is applied and the nature of the lead plates or foils to which the material is applied. Typical printing processes which may be used are high pressure, low pressure, offset and silk-screen processes although it it also possible to use photolithographic or other photographic printing processes.

Naturally, the masking material can be thin foils of electrically nonconducting and electrolyte impermeable materials, especially synthetic resins, which can be stamped from sheets thereof and hot bonded to the lead plates or foils, for example, in a rolling process, thereby forming an intermittent mechanically tight bond with the lead plates or foils.

To increase the strength of such thin masking foils, which can be stamped in a grid-like pattern, it has been found to be advantageous to embed within the foil material or to bond to the foil, silicate-glass fibers. Such fibers can be introduced in a pattern or simply randomly.

A similar effect can be obtained by reinforcing the edges surrounding the windows of the foils or along the perimeter thereof with glass fibers or strands. It has been found to be advantageous to stamp the masking foils in square or rectangular patterns.

It has also been found to be desirable to cover the entire broad surfaces of the electrode foils with a light layer of glass fibers in the form of a fiber web fabric or fleece and to bond the resulting web with the masking layers in the grid or lattice pattern by chemical bonding or solubilization of the surface of the masking material or by thermal fusion of the surface of the masking material to these webs. In this case, an open work of the webs or fleeces covers the windows in the masking material through which the electrochemical process forms the active mass on the lead foils or plates. The electrolyte thus has access to the exposed regions within the masking lattice through the webs of the glass fibers. In this case, the glass fiber webs overlying these windows form retaining nets for the active mass. In the region of the masking lattice, moreover, the glass fiber web can be coated with a synthetic resin mass which cannot be attacked by the electrolyte and which can be applied in a liquid state and thereafter hardened to bond with the mask of the foil.

Alternatively, a lattice-pattern glass fiber web can be coated on one side with the liquid and hardenable synthetic resin mass which can then be bonded under heat and pressure to the lead foil. This synthetic resin mass also should be impermeable to the electrolyte and of such nature that it is not attacked thereby.

In yet another embodiment of the invention, the web of glass fibers can include thicker fiber or fiber bundles which are mutually spaced apart and parallel to another and are bonded with the foil to the masking lattices, these thicker fibers or fiber bundles running vertically in the assembled state of the accumulator and serving as passages for forming open flow channels for the circulation of the electrolyte.

According to still another feature of the present invention, the lead plates or foils used to fabricate the negative and positive electrodes of the accumulator are formed from a lead melt with which fibers are mixed. The fibers can be composed of an electrically nonconductive material, for example, silicate glass, rock or slag wool. Such materials are not attacked by electrolytes such as sulfuric acid. Relatively large volume or weight proportions of such fibers can be added to the lead so that the composite lead plates or foils have a specific gravity substantially less than that of metallic lead.

According to still another feature of the invention, two or more previously rolled foils can be disposed on opposite sides of an intermediate layer of, for example, silicate glass and/or stretched synthetic resin fibers or filaments which can form the fabric or fleece. The resulting composite is rolled together into a single foil and the fibers between the layers of this foil can be held in place by cold bonding or flow of the lead.

It has also been found to be advantageous when the lead foils are separated from one another, if they are of different polarity, by a multiplicity (at least three) very thin glass or synthetic resin fiber webs or foil. In this case, the filament or fiber direction of the two outer spacer webs which lie against the lead foils of the different polarity are transverse or crosswise to the flow direction of the electrolyte while the intervening fiber layer is formed with thicker or bundled fiber strands which are spaced at a greater distance from one another parallel to each other and to the flow direction of the electrolyte. This assembly of spacer webs provides fine passages allowing access of the electrolyte which can be charged with gas bubbles, to the active surface of the electrodes.

The formation of such fine gas bubbles is promoted by the construction of the separator thus described and occurs predominantly during charging.

A further improvement can be obtained by treating the lead foils, prior to application of the mask, in warm or heated dilute sulfuric acid to form lead sulfate coatings on the surfaces of the lead foils which have been found to promote bonding of the masking material. Bonding can be rendered still more effective by electrolytically depositing a fine layer of lead on the lead foils or plates before application of the mask and preferably prior to the sulfatization of the surfaces thereof.

It has also been found to be advantageous, after application of the masks to apply to the free exposed lead surfaces of the foil within the regions surrounded by the mask, an active or later-activatible mask of, for example, lead (Pb), lead oxide-lead monooxide (PbO), lead peroxide or dioxide ($PbO_2$), red lead ($Pb_3O_4$) or mixtures thereof.

The plates or foils of lead, which are provided with the masking lattices, advantageously have a rectangular configuration and can be formed on one or more size with one or more small foils. This also allows the lead foil within the full surfaces to be provided with stamped openings which has been found to increase the electrical conductivity and effective surface area. Best results are obtained when a set of cutouts are formed along their inner peripheries.

It has also been found advantageous, upon stacking of the lead foil and the porous separators, to cast molten lead in the passages formed by the stamping mentioned previously. This allows all of the foils of the same polarity to be bonded mechanically together and insures effective current distribution to the foils.

The resulting block, consisting of a multiplicity of lead foils of different polarity and nonconductive porous grids between them, can be provided with a pump to effect forced circulation of the electrolyte through the flow passages.

While the system has been described above primarily for lead sulfuric acid foil accumulators, i.e. storage batteries, and like systems capable of charging and discharging and hence electrochemical regeneration, it will be understood that other active masses, electrodes and electrolytes can be employed. For example, a secondary element can use as a cathode a thin galvanized copper foil and as an anode a lead dioxide ($PbO_2$) covered lead foil while the electrolyte is zinc sulfate.

BRIEF DESCRIPTION OF THE DRAWING

The above and other objects, features, and advantages of the present invention will become more readily apparent from the following description, reference being made to the accompanying drawing in which.

SPECIFIC DESCRIPTION

Figure 1:
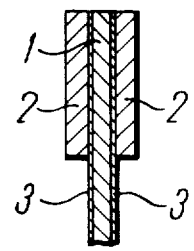
FIG. 1 is a diagrammatic sectional view through an electrode formed from a thin plate or foil, drawn to a greatly enlarged scale.
Figure 1:
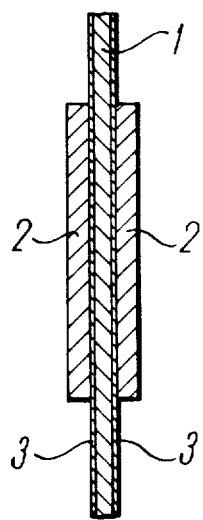

FIG. 1 shows a cross section through a foil assembly adapted to provide a negative or positive electrode for an accumulator 37.

This electrode is constituted by a lead plate or lead foil which can have a thickness of for example 50 microns and is covered on both sides with masks 2 in a lattice or grid configuration. The masks 2 are composed of a material which is impermeable to the electrolyte 47 (FIG. 12) and which is not attacked by the electrolyte.

For better retention of the masks 2 on the lead plate or lead foil 1, the latter is first formed on its opposite faces with a monomolecular coating 3 of lead sulfate ($PbSO_4$). Prior to the application of the lead sulfate coating by immersion of the lead foil in hot sulfuric acid, the surfaces of the foil can be provided with a light coating of lead by electrochemical deposition.

To increase the structural strength of the electrode and reduce the specific gravity, the lead plate or foil can be rolled from a sheet coat from a melt in which glass fibers are added to the lead.

Figure 2:
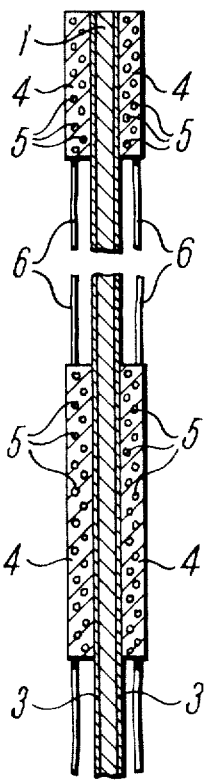
FIG. 2 is a section similar to FIG. 1 illustrating another embodiment of an electrode plate or foil for a secondary element, namely, an accumulator or storage battery.

FIG. 2 shows a modification of the system of FIG. 1 and hence another electrode which can be used as the positive or negative electrode of the accumulator. In this embodiment, the lead plate of foil 1 is provided with masking layers 4 on its opposite broad surfaces, the masking layers being mixed with glass fibers 5 and being reinforced by strands 6 thereof.

Figure 3:
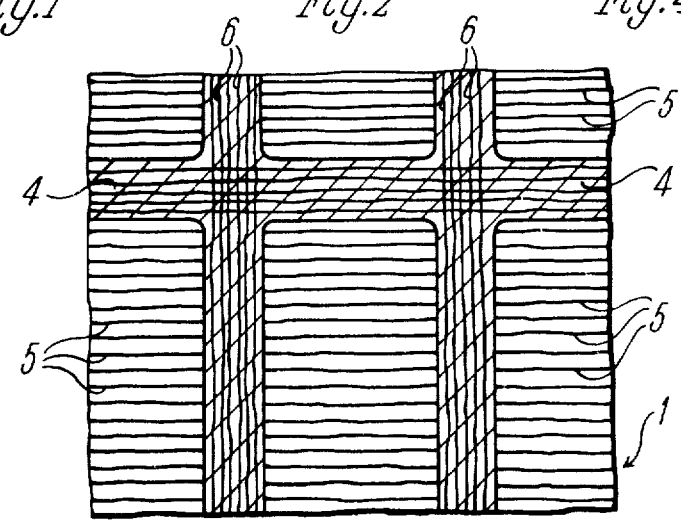
FIG. 3 is a front elevational of a portion of the plate or foil of FIG. 2.

While the cross sections in FIGS. 1 and 2 are greatly enlarged by comparison with the actual dimension of the electrode plate, the elevational view of FIG. 3 is only about a fifth of this enlargement.

It will be apparent from FIG. 3 that the masking layers 4, which are indicated by diagonal hatching, are of a lattice configuration with thin webs extending in mutually octhogonal directions and defining windows between them through which the lead foil or plate is exposed to the electrolyte. The horizontal and vertical glass fibers 5 and 6, respectively, extend across the exposed regions of the lead to form traps for the active material further improving the retention thereof upon the electrode.

Figure 4:
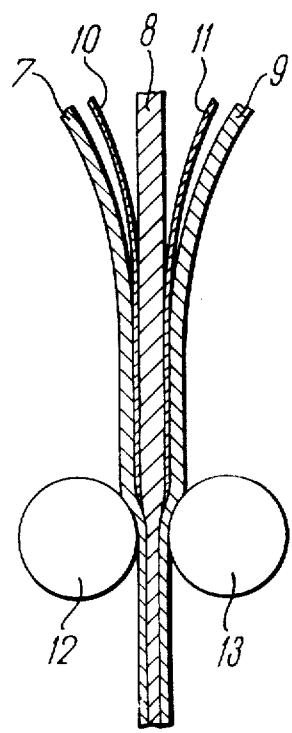
FIG. 4 is a schematic illustration of the formation of the composite of the multiplicity of lead foils to a single thin-wall electrode according to the invention.

For greater strength, the electrode members 1 can each be formed as illustrated diagrammatically in FIG. 4. In this system, a pair of lead foils 7 and 9 sandwich between them and intermediate lead foil 8 at a pair of glass fiber fleeces 10 and 11 which which flank the intermediate foil 8. The resulting stack is passed through the neck of a pair of rollers 12 and 13 which fuse the foils together and cause cold flow of the lead through the glass fiber fleeces. The assembly of FIG. 4 can be rolled to the aforementioned thickness of the foil 1.

Each of the foils 7, 8 and 9 or one or two of them can, in addition, be composed of a mixture of lead and glass fibers and has been described in connection with FIG. 1.

Figure 5:
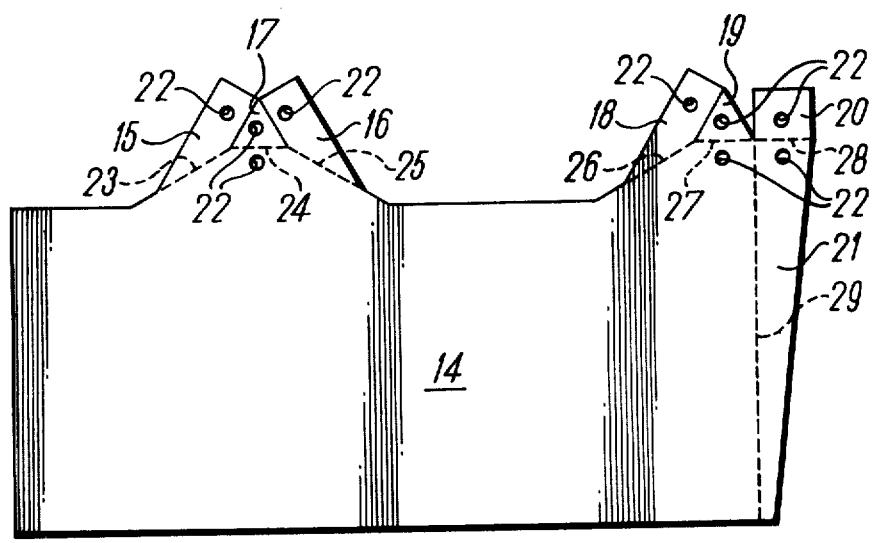
FIG. 5 is a front elevational view of an upfolded plate or foil prior to the folding step.

FIG. 5 shows the outline of one of the stamped lead plates of foils 14. These foils may have the cross sections shown in FIG. 1, 2, and 4 and are provided with the masking layers in lattice configuration as represented in FIG. 3.

The foil 14 is formed with stamped out foil flaps 15-21, all of which are provided with circular stamped holes 22. For assembly of the stack, the foil 14 is folded along the fold lines represented by the broken lines 23-29 in the order of their numbering. In this manner, all of the stamped out portions are folded over and behind one another so as to reinforce the regions at which the foils will be joined together by electrical conductors as will be described below.

Before the stamping and folding process, the foil plate 14 is provided on both sides with the acid-resistant nonconductive masks as will be described in greater detail in connection with FIG. 6. Before or, if desired, after the stamping and folding process, the surfaces of the lead foil which remain free of the masking layers are provided with active or activatible masses of, for example, lead (Pb), lead oxide, lead monooxide (PbO), lead dioxide ($PbO_2$), red lead ($Pb_3O_4$) or mixtures thereof. The surfaces provided with the active mass or the surfaces which are not to receive the active mass can be sulfurized by immersion of the foil 14 in boiling dilute sulfuric acid to form the bonding lead sulfate surfaces 3 previously described.

Figure 6:
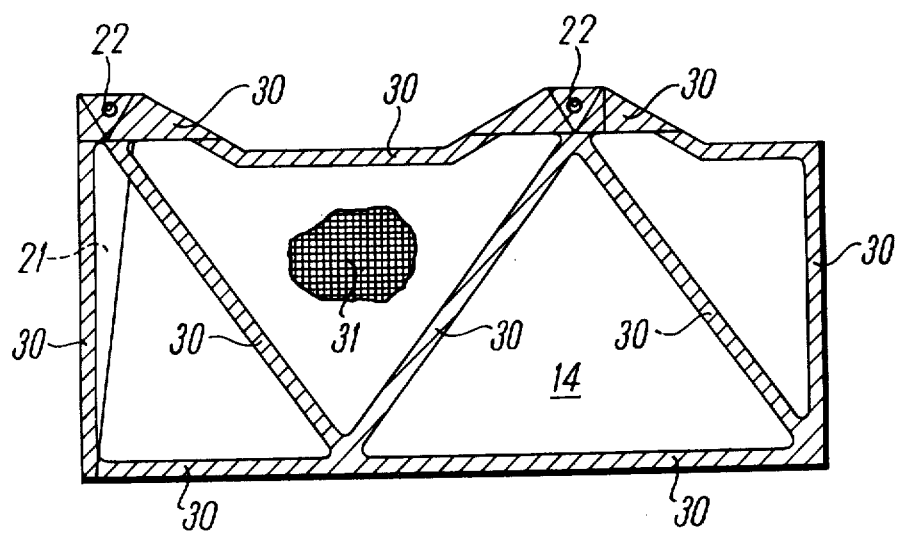
FIG. 6 is a rear view of the plate or foil of FIG. 5 after the folding thereof.

The electrode 14 shown in FIG. 6 has been illustrated diagrammatically and is shown on its reverse side. In this illustration, all of the stamped flaps 15 through 21 have been folded so that only two throughgoing openings are provided at a pair of upper lugs as shown in FIG. 6 at 22.

In this embodiment, the nonconductive coverings are represented by the masks 30 which are disposed in a strict-like configuration all around the periphery of the electrode and along a plurality of inclined strips.

The masks 30 are provided on both sides of the plate and leave exposed the plate regions formed as triangular openings in the mask. The truss-like construction illustrated in FIG. 6 provides a high degree of mechanical stability and as well as the necessary electrical conductivity over the entire electrode and mechanical rentivity for the active mass.

In addition, the electrode can be provided in the metalic regions which will be left free by the mask 30, with a lattice-like mask having the pattern shown in 31 over a portion of the electrode. This mask 31 is likewise composed of acid resistant nonconductive material. The fiber glass reinforcements and strands can be provided as described in connection with FIG. 2 and FIG. 3 and the foil 14 can be a composite of the type fabricated in FIG. 4.

Care must be taken in applying both the grid 31 and the strip pattern 30 of the masking material that the bars or strips of the masks of two juxtaposed electrodes of opposite polarity be precisely juxtaposed, i.e., in exact registry with one another, the masks of the two juxtaposed surfaces being precisely coextensive.

The raster strips can be applied by printing in the manner described previously. The micro-lattice plate which thus results has extremely small windows in which the active mass, which can be later formed in situ thereon or applied to the electrode 14, is tightly held and is connected positively with the current supply network.

Figures 7, 8:
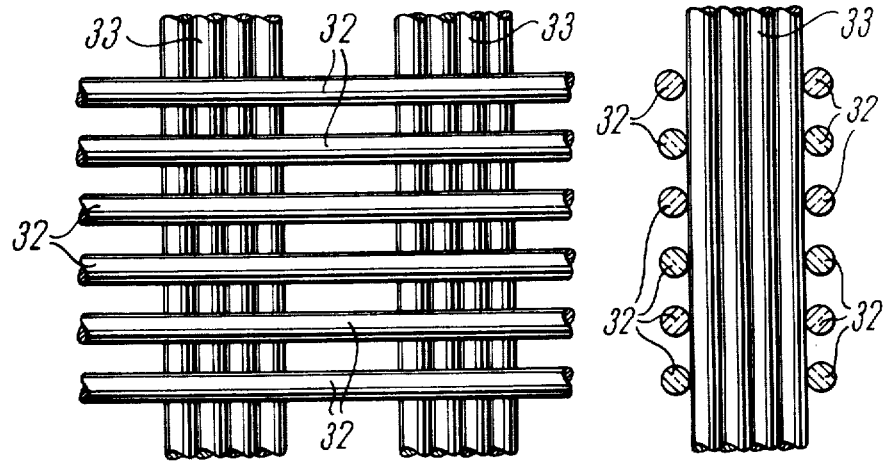
FIGS. 7-9 are illustrations of various arrays of spacers for use in the system of the present invention, drawn to an enlarged scale.
Figure 9:
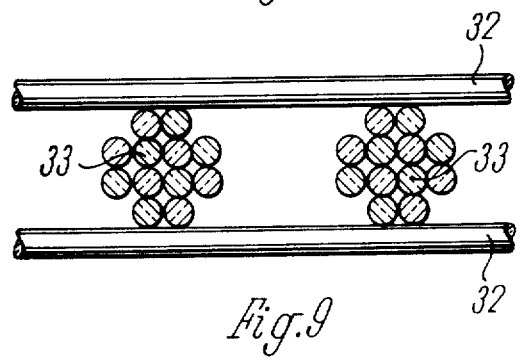

FIGS. 7, 8 and 9 show the spacers which can be used for lead foil electrode 14 of different polarity. The spacers are here shown to be composed of electrically nonconductive material, for example, glass fibers in a fine lattice pattern. The spacers are each formed from a plurality of layers of horizontal glass fibers 32 or glass fibers 32 which are slightly inclined to the horizontal and spaced apart by fiber bundles 33 which provide a greater spacing between the two layers of horizontal fibers than the thickness of one of the glass fibers webs or of the glass fibers themselves. The spacer layers are bonded together by adhesive bonding or thermal fusion. Such stack of glass fiber webs can be interposed between each pair of opposite-polarity electrodes 14.

Figure 10:
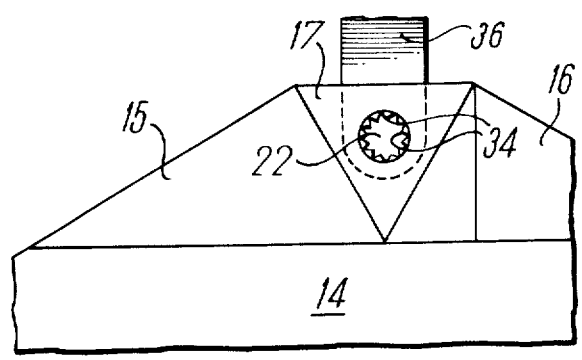
FIG. 10 is a front view illustrating the electrical connection of a plate or foil according to the invention.
Figure 11:
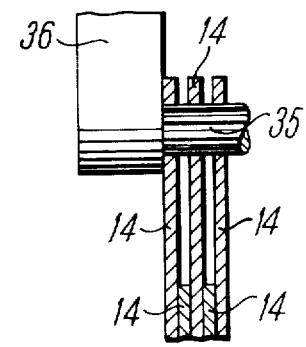
FIG. 11 is a cross-sectional view through the connected portions of a plurality of such foils.

FIGS. 10 and 11 show the electrical and mechanical connection of the lead foils 14 of the same polarity together. According to the invention, a current-supply or pick-up terminal 36 is provided with a pair of pins 35, each of which passes through one set of aligned opening of a stack of plates 14. The openings may be provided with fine teeth along their periphery to ensure good electrical connection with pins 35 (see the teeth 34 in FIG. 10). The one terminal member 36 may lead out of the battery while the other terminal member with its pins 35 can be used to connect the stack of three electrodes shown in FIG. 11 with another stack of electrodes of the same polarity. Between the electrodes 14 connected by the pins 35 in FIG. 11, there are shown diagrammatically the electrodes 14 of opposite polarity, it being understood that between the juxtaposed faces of the electrodes of opposite polarity, spacer assemblies of the type shown in FIG. 8 or FIG. 9 are provided.

Figure 12:
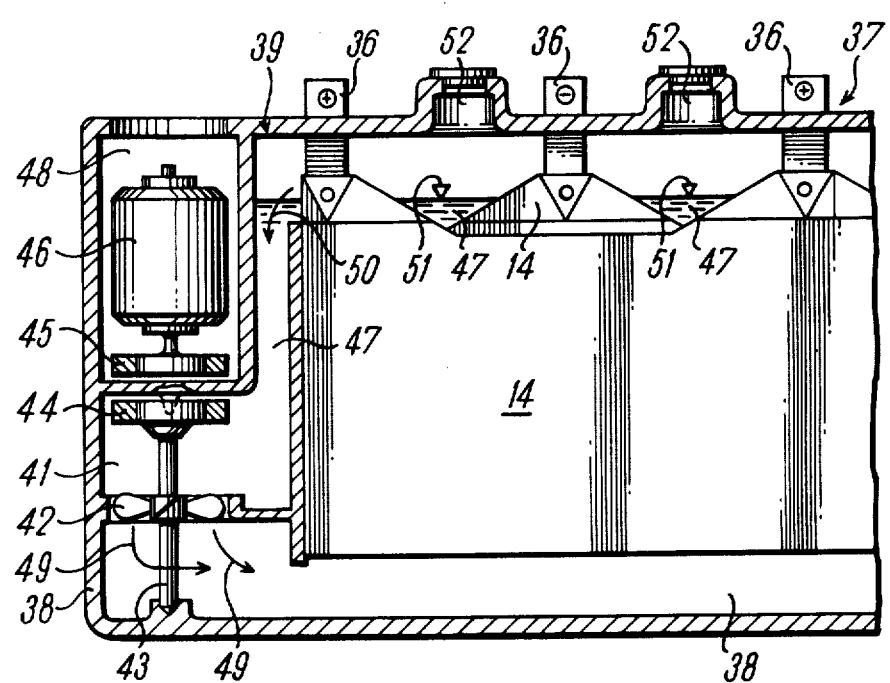
FIG. 12 is a fragmentary cross-sectional view through an accumulator according to the invention.
Figure 13:
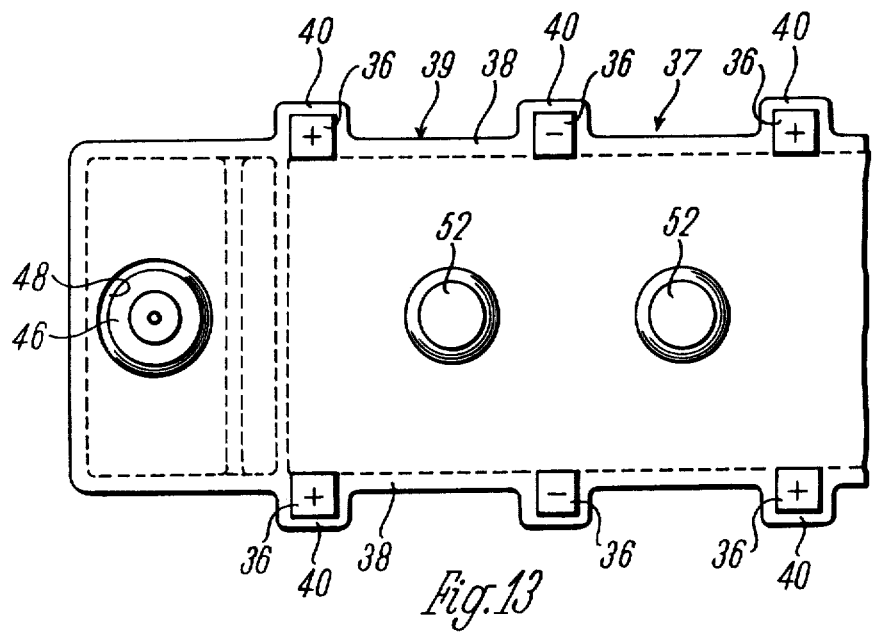
FIG. 13 is a fragmentary plan view of this accumulator.

The overall construction of the lead acid accumulator of the present invention will be apparent from FIGS. 12 and 13, the former being a cross section while the latter is a plan view of the complete accumulator or storage battery. The lead foils are provided in packets or stacks, preferably mirror symmetrically, as positive and negative electrodes with the foils of the packets being interdigitated and separated by the aforementioned spacers. The terminal members 36 are received in bulges 40 of the vessel 30 which postly conforms in dimensions to the stack of the plates 14.

To improve the bond between the pins 35 and electrodes 14, the pins 35 can be cast in situ within the internally toothed bores 22 or a casting of molten lead can be made around the pins 35 and into the interstices between the teeth (FIG. 10).

In an antichamber 41 of the vessel 38 containing the electrode packets, there is provided a rotary impeller blade 42 which is fixed to a shaft 43 connected by a magnetic clutch to a motor 46 received within a further compartment 48 of this housing. More specifically, the shaft 43 carries a magnetic disk 44 which is juxtaposed with the magnetic disk 45 driven by the motor 46. Chamber 48 is free from the electrolyte 47. The electrolyte 47 is circulated by the impeller blade 42 in the direction of the arrows 49 and thus is forced below the stack of plates to pass upwardly and then flow downwardly to the top of the impeller.

Arrow 50 shows the downward movement of the electrolyte from above the plate stacks.

The electrolyte level is represented at 51 and should reach above the stack of plates 14.

The gases released from the foil stacks accumulate above the level 51 and can be vented to the atmosphere through venting plugs 52 of conventional design.

Naturally, when these foils are used to form the accumulator or storage battery, these foils need not be stacked in a planar condition as has been shown, but can be coiled if desired.

I claim:

1. A lead-acid accumulator or storage cell comprising:
    a first and a second stack of mutually spaced thin metal foils disposed in interleaved relationship and forming positive and negative plates respectively;
    respective separators between the foils of opposite polarity;
    a housing receiving the positive and negative plates and the separators between them and containing a sulfuric acid electrolyte, said housing having internal dimensions close to the external dimensions of said stacks and closely surrounding same; and
    electrically nonconductive and electrolyte-impermeable masks on only limited areas of juxtaposed faces of foils of opposite polarity surrounding active-mass regions thereof so that each foil has such masks coextensively on each of its faces, the masks of the juxtaposed faces being exactly in registry and of mutually coextensive areas, said masks being bonded to the respective foils and the faces of said foils not covered by said masks being continuously in contact with said electrolyte to sustain electrochemical reaction therewith.

2. The accumulator defined in claim 1 wherein said electrolyte is dilute sulfuric acid, said foils are stacked and are composed of lead, and said masks form uninterrupted patterns upon the faces of the respective foils.

3. The accumulator defined in claim 2 wherein said masks are printed on said lead foils.

4. The accumulator defined in claim 2 wherein said masks are stamped from thin synthetic resin sheets and are bonded to said lead foils.

5. The accumulator defined in claim 2 wherein said masks are composed of synthetic resin material reinforced with silicate glass fibers.

6. The accumulator defined in claim 2 wherein said masks are reinforced with mutually orthogonal arrays of parallel glass fiber strands, the glass fiber strands overlying exposed regions of the lead foils surrounded by portions of the respective masks.

7. The accumulator defined in claim 2 further comprising a layer of electrolyte-permeable glass fibers in a web coextensive with the surface of each of said foils and bonded to the respective mask.

8. The accumulator defined in claim 2 wherein said mask is formed as a layer of synthetic resin material bonded to a glass fiber web and applied to the respective lead foil under pressure.

9. The accumulator defined in claim 1 wherein said lead foils are oriented vertically, said separators including fiber strands extending in a vertical direction and forming flow passages for the circulation of electrolyte between juxtaposed lead foils.

10. The accumulator defined in claim 2 wherein said lead foils are composed of a mixture of lead and silicate glass, rock wool or slag wool fibers.

11. The accumulator defined in claim 10 wherein the lead foils contain a high volume proportion of said fibers to reduce the specific gravity of the lead foils significantly below that of pure metallic lead.

12. The accumulator defined in claim 2 wherein each of said separators includes at least three layers of fiber strands including a pair of outer layers with strands running generally horizontally and at least one intermediate layer having thicker strands running substantially vertically.

13. The accumulator defined in claim 2 wherein each of said lead foils is formed with a thin coating of lead sulfate by immersion in heated dilute sulfuric acid prior to application of the respective masks.

14. The accumulator defined in claim 13 wherein each of said lead foils is coated with a fine layer of electrolytically deposited lead prior to the formation of the lead sulfate coatings.

15. The accumulator defined in claim 2 wherein exposed regions of said foils surrounded by said masks are provided with an active or activatable mass of lead, lead monooxide, lead dioxide or red lead or mixtures thereof.

16. The accumulator defined in claim 2 wherein each of said lead foils has a generally rectangular configuration and is formed on at least one side with at least one fold for stiffening the lead foil.

17. The accumulator defined in claim 16 wherein said fold is provided with a stamped-out opening facilitating electrical connection to a terminal, said opening being provided with an internal array of fine saw teeth engageable with an electrical conductor.

18. The accumulator defined in claim 17 further comprising a body of molten lead cast into the stamped-out openings to electrically and mechanically connect a plurality of lead foils together to form a stack of a given polarity.

19. The accumulator defined in claim 2 further comprising a pump in said vessel for circulating electrolyte between the lead foils of opposite polarity.

20. An accumulator or energy storage element comprising:
a plurality of thin metal foils disposed in interleaved relationship and forming positive and negative plates;
respective separators between the foils of opposite polarity;
a housing receiving the positive and negative plates and the separators between them and containing an electrolyte; and
electrically nonconductive and electrolyte-impermeable masks on juxtaposed faces of foils of opposite polarity surrounding active-mass regions thereof, the masks of the juxtaposed faces being exactly in registry and of coextensive areas, said masks being bonded to the respective foils, each of said foils being formed as a sandwich of at least two lead layers and a fiber web between them, said lead layers being cold pressed against said fiber web to effect cold flow of lead into said web.

21. The accumulator in claim 20 wherein each of said foils consists of at least three layers of lead and two fiber webs, each fiber web being sandwiched between an outer lead layer and an intermediate lead layer, the resulting layered structure being rolled to the thickness of the lead foil.

22. The accumulator defined in claim 20 wherein said masks are composed of synthetic resin material reinforced with silicate glass fibers.

23. The accumulator defined in claim 20 wherein said masks are reinforced with mutually orthogonal arrays of parallel glass fiber strands, the glass fiber strands overlying exposed regions of the lead foils surrounded by portions of the respective masks.

24. The accumulator defined in claim 20, further comprising a layer of electrolyte-permeable glass fibers in a web coextensive with the surface of each of said foils and bonded to the respective mask.

25. The accumulator defined in claim 20 wherein said mask is formed as a layer of synthetic resin material bonded to a glass fiber web and applied to the respective lead foil under pressure.

26. The accumulator defined in claim 20 wherein said lead foils are oriented vertically, said separators including fiber strands extending in a vertical direction and forming flow passages for the circulation of electrolyte between juxtaposed lead foils.

27. The accumulator defined in claim 20 wherein each of said separators includes at least three layers of fiber strands including a pair of outer layers with strands running generally horizontally and at least one intermediate layer having thicker strands running substantially vertically.

28. The accumulator defined in claim 20 wherein each of said lead foils is formed with a thin coating of lead sulfate by immersion in heated dilute sulfuric acid prior to application of the respective masks.

29. The accumulator defined in claim 28 wherein each of said lead foils is coated with a fine layer of electrolytically deposited lead prior to the formation of the lead sulfate coatings.

30. The accumulator defined in claim 20 wherein exposed regions of said foils surrounded by said masks are provided with an active or activatable mass of lead, lead monooxide, lead dioxide or red lead or mixtures thereof.

31. The accumulator defined in claim 20 wherein each of said foils has a generally rectangular configuration and is formed on at least one side with at least one fold for stiffening the lead foil.

32. The accumulator defined in claim 31 wherein said fold is provided with a stamped-out opening facilitating electrical connection to a terminal, said opening being provided with an internal array of fine saw teeth engageable with an electrical conductor.

33. The accumulator defined in claim 32, further comprising a body of molten lead cast into the stamped-out openings to electrically and mechanically connect a plurality of lead foils together to form a stack of a given polarity.

34. The accumulator defined in claim 20, further comprising a pump in said vessel for circulating electrolyte between the lead foils of opposite polarity.

* * * * *